United States Patent
Zents et al.

(10) Patent No.: US 7,287,491 B2
(45) Date of Patent: Oct. 30, 2007

(54) ASSEMBLY OF AN ACTIVITY METER AND A FASTENING STRAP FOR FASTENING THE ACTIVITY METER TO THE NECK OR THE LEG OF AN ANIMAL

(75) Inventors: Otto Theodorus J. Zents, Lichtenvoorde (NL); Jan Kees Te Riet O.G. Scholten, Hengelo (NL); Albertino Bernardo M. Verstege, Aalten (NL)

(73) Assignee: N.V. Nederlandsche Apparatenfabriek NEDAP, DC Groenlo (NL)

( * ) Notice: Subject to any disclaimer, the term of this patent is extended or adjusted under 35 U.S.C. 154(b) by 84 days.

(21) Appl. No.: 10/884,959

(22) Filed: Jul. 7, 2004

(65) Prior Publication Data
US 2005/0005878 A1    Jan. 13, 2005

(30) Foreign Application Priority Data
Jul. 7, 2003    (NL) .................................... 1023843

(51) Int. Cl.
*A01K 27/00*    (2006.01)
(52) U.S. Cl. ...................................... 119/863; 119/858
(58) Field of Classification Search ............... 119/856, 119/858, 863, 654; D30/152; 2/129, 319, 2/321–322
See application file for complete search history.

(56) References Cited

U.S. PATENT DOCUMENTS

| | | | | |
|---|---|---|---|---|
| 1,155,187 A * | 9/1915 | Woodruff | ........................ | 2/237 |
| 2,632,894 A * | 3/1953 | Sidney | ........................... | 2/320 |
| 2,900,696 A * | 8/1959 | Bacon | ....................... | 24/595.1 |
| D213,972 S * | 4/1969 | Anderson et al. | .......... | D30/152 |
| 3,466,668 A * | 9/1969 | Ochiai | ........................... | 2/322 |
| 3,653,099 A * | 4/1972 | Hoffman | .................... | 24/16 PB |
| 3,800,450 A | 4/1974 | Laugherty et al. | | |
| 3,918,407 A * | 11/1975 | Greenberg | .................. | 119/654 |
| 4,141,322 A * | 2/1979 | Evans et al. | ................ | 119/654 |
| 4,464,854 A | 8/1984 | Hall et al. | | |
| 4,499,680 A | 2/1985 | Coburn et al. | | |
| 5,318,505 A * | 6/1994 | Sou | ............................. | 602/19 |
| 5,355,839 A * | 10/1994 | Mistry | ......................... | 119/858 |
| 5,519,893 A * | 5/1996 | Silver | ............................ | 2/321 |

(Continued)

FOREIGN PATENT DOCUMENTS

JP    09201143 A  *  8/1997

*Primary Examiner*—Son T. Nguyen
(74) *Attorney, Agent, or Firm*—Jacobson Holman PLLC

(57) ABSTRACT

An assembly of an identification unit, more particularly an activity meter for identifying an animal and possibly measuring movements of an animal to which the identification unit, in use, is fastened, and a fastening strap, connected with the identification unit, for fastening the identification unit to the neck or a leg of the animal, the fastening strap being provided with a first and second free end, the assembly being further provided with a closing member comprising a slotted tunnel, while, in use, the strap forms a loop and at a position where a first part and a second part of the strap overlie each other, is enclosed by the tunnel, the assembly being further provided with first fastening means for connecting the first part and the closing member with each other, and second fastening means for fastening the second part to the first part and/or the closing member, with at least a part of the second fastening means, in use, being situated in the tunnel.

26 Claims, 4 Drawing Sheets

U.S. PATENT DOCUMENTS

| | | | |
|---|---|---|---|
| 5,758,443 A * | 6/1998 | Pedrazzini | 40/633 |
| 6,283,065 B1 * | 9/2001 | Shorrock et al. | 119/863 |
| 6,343,384 B1 * | 2/2002 | Ida | 2/236 |
| 6,438,807 B1 * | 8/2002 | Ptolemy | 24/484 |
| 2001/0032597 A1 * | 10/2001 | Denesuk et al. | 119/706 |

* cited by examiner

ASSEMBLY OF AN ACTIVITY METER AND A FASTENING STRAP FOR FASTENING THE ACTIVITY METER TO THE NECK OR THE LEG OF AN ANIMAL

The invention relates to an assembly of an identification unit, more particularly an activity meter for identifying an animal and possibly measuring movements of an animal to which the identification unit, in use, is fastened, and a fastening strap, connected with the identification unit, for fastening the identification unit to the neck or a leg of the animal, the fastening strap being provided with a first and second free end.

An identification unit for determining the identity of an animal is known per se. To that end, the identification unit can be provided, for instance, with identification means, known per se, comprising a resonant circuit and a chip in which an identification code is stored. The identification code can then be read out by introducing the identification unit into an electromagnetic interrogation field. An identification unit which is at the same time designed as an activity meter for measuring movements of an animal is also known per se. Most activity meters are arranged for measuring and simultaneously recording a movement of an animal. Typically, this involves the number of movements within a particular period of time. The known activity meter can be read out for further processing of the collected information. Also, with the aid of the activity meter, the animal can be identified by reading out an identification code as described above.

It is known for the fastening strap to be provided with a clasp for fastening the strap carrying the activity meter around a leg or a neck of an animal.

A disadvantage of such a clasp is that it is relatively costly and that the animal may get hurt by the clasp, for instance when the clasp is wedged between the wall and the animal. Further, a fastening strap provided with a clasp is difficult to fasten to an animal.

The object of the invention is to provide a solution to at least one of the disadvantages mentioned. To that end, the assembly according to the invention is characterized in that the assembly is further provided with a closing member comprising a slotted tunnel, while, in use, the strap forms a loop and at a position where a first part and a second part of the strap overlie each other, is enclosed by the tunnel, the assembly being further provided with first fastening means for connecting the first part and the closing member with each other, and second fastening means for fastening the second part to the first part and/or the closing member, with at least a part of the second fastening means, in use, being situated in the tunnel.

The slotted tunnel and the strap can, if so desired, be manufactured in a simple and inexpensive manner, and can take a shape such that the animal cannot easily be hurt by it.

Preferably, the second fastening means are provided with at least one opening in the second part of the strap and at least one resilient lip which is connected with the first part of the strap and which, in use, reaches into the opening of the second part. In this way, an audible snap connection can be generated. In particular, the lip reaches into the opening with play. What is thereby precluded is that the strap is mounted too tightly around the animal. The tunnel ensures that the at least one resilient lip reaching into the at least one opening cannot be easily forced out of the opening when it is attempted to pull open the loop formed by the strap.

In particular, a free end of the resilient lip points in a direction of the second free end of the strap.

In particular, further, the first fastening means comprise a recess and a projection which engage into each other, the closing member being provided with the recess or the projection and the first part being provided with the projection or the recess, respectively. It is also possible that the first fastening means are formed by the tunnel which clampingly encloses the first and second part.

According to a particularly advantageous embodiment, the tunnel is arranged in a housing of the identification unit. Now that the housing at the same time forms the tunnel, there is no separate tunnel involved. This makes the assembly simple and economically advantageous.

Preferably, the strap is made at least substantially from polyurethane. This makes it particularly comfortable for the animal to wear the strap. Preferably, furthermore, the strap is provided with an antibacterial additive.

According to a particular embodiment, in an inner side of the tunnel a recess is provided for receiving a part of the lip reaching through the opening. As a result, the resilient lip can take a more perpendicular upright position relative to the plane of the strap when the loop is pulled open. This yields an extra strong locking as well as more play.

The invention will be further elucidated with reference to the drawing, wherein.

Figure 5:
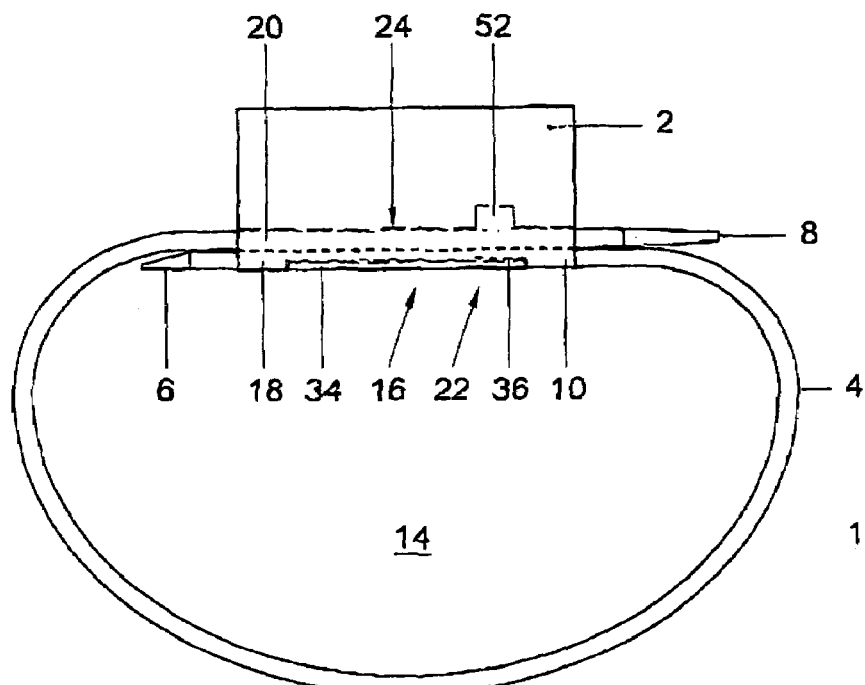
FIG. 5 shows a side view of the assembly according to FIG. 3 when the strap has been closed to form a loop.

In FIG. 5, reference numeral 1 designates an assembly of an identification unit 2 for identifying an animal and a fastening strap 4, connected with the identification unit 2, for fastening the identification unit to the neck or a leg of an animal. In this example, the identification unit is provided for that purpose with identification means, known per se, which respond by emitting an identification code when the identification unit is introduced into an electromagnetic interrogation field. To that end, the identification means may be provided, for instance, with a resonant circuit and a chip connected thereto, in which the identification code is stored. The identification means preferably draw the energy required for operation from the electromagnetic interrogation field. The identification means can thus form part of an identification system which is further provided with a reading unit, known per se, for generating the electromagnetic interrogation field. However, it is also possible for the identification unit to be provided with an internal energy source such as an accumulator or a battery. The identification system can then be designed both as an absorption system and as a transmission system.

In this example, the identification unit 2 is moreover designed as an activity meter 2 for measuring, in a manner known per, movements of an animal to which the activity meter, in use, has been fastened. The fastening strap 4 is provided with a first free end 6 and a second free end 8.

The assembly is further provided with a closing member 10 which includes a slotted tunnel 12. As shown in FIG. 5, the strap 4 in use forms a loop 14. In use, furthermore, at a position 16 where a first part 18 and a second part 20 of the strap overlie each other, the strap 4 is enclosed by the tunnel. The assembly is further provided with first fastening means 22 for mutually connecting the first part 18 and the closing member 10. Furthermore, the assembly is provided with second fastening means 24 for fastening the second part 20 to the first part 18 and/or to the closing member, with at least a part of the second fastening means 24 in use being situated in the tunnel 12.

In this example, the second fastening means are provided with at least one opening 26.1.1 in the second part 20 and at least one resilient lip 28.1.1 which is connected with the first part 18 of the strap and which, in use, reaches into the opening 26.1.1 of the second part 20.

More particularly, the strap is provided with multiple openings 26.i.j, where, in this example, i=1,2,3, . . . 9 and j=1,2. The openings 26.i.j are arranged in groups 30.k (k=1,2,3,4). The lips in this example are also arranged in groups 32.l (l=1). In this example, there is one group 32.l involved. It holds, therefore, that the number of groups of openings is greater than the number of groups of lips. In the example, each group of openings 30.k is provided with four openings. Thus, the group 30.l is provided with the openings 26.1.1, 26.1.2, 26.2.1 and 26.2.2.

Entirely analogously, it holds that the group of lips 32.l is provided with four lips 28.1.1, 28.1.2, 28.2.1 and 28.2.2. A pattern of a mutual arrangement of the openings within each group of openings is equal to a pattern of a mutual arrangement of the lips within the group of lips. Furthermore, the groups of openings extend over a greater part of the strap than the group of lips. The number of groups of openings is greater than the number of groups of lips. Furthermore, each group of lips comprises at least two lips which, in a direction transverse to the longitudinal direction of the strap, are separated at a distance from each other. In this example, each group comprises two pairs of lips, while it holds for each pair of lips that it comprises two lips which are separated at a distance from each other in a direction transverse to the longitudinal direction of the strap.

Figure 4:
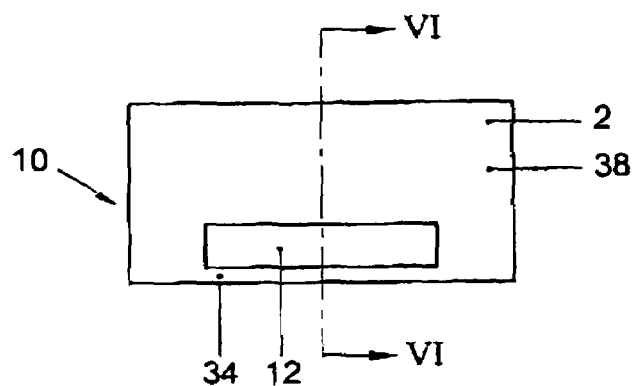
FIG. 4 shows a side view of the activity meter according to FIG. 3 in the direction of the arrow P according to FIG. 3.

The first fastening means 22 comprise a recess and a projection which engage one into the other. In this example, the closing member 10 (see FIGS. 4, 5 and 6) is provided with the projection 34 and the first part of the strap is provided with the recess 36 (see FIGS. 5, 6 and FIG. 1). Further, in this example, the tunnel 12 is provided in a housing 38 of the activity meter 2. The activity meter 2 and the closing member 10 are therefore of integrated design.

The operation of the assembly described up to this point is as follows.

Figure 3:
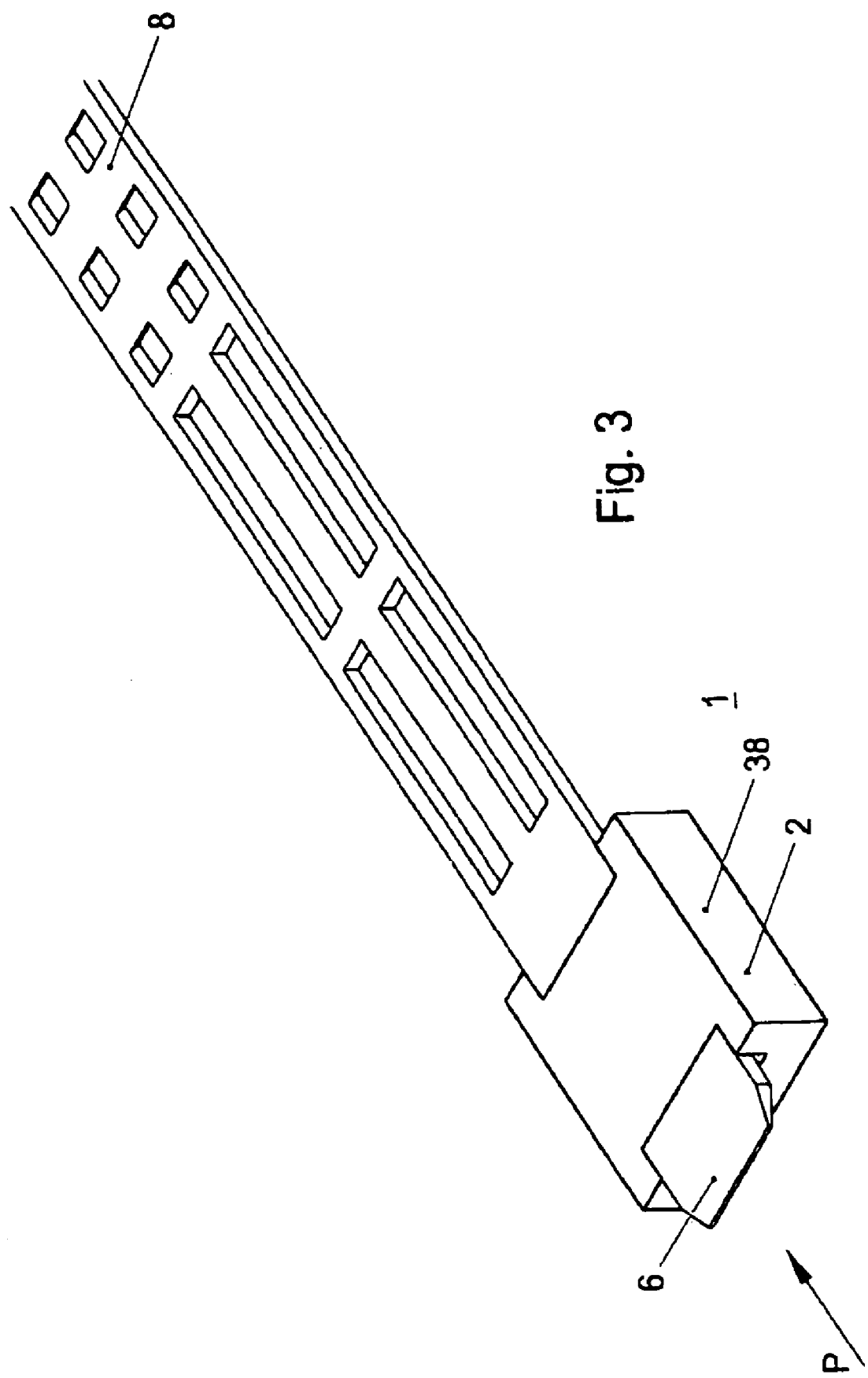
FIG. 3 shows a bottom view of the strap according to FIG. 1, with additionally an activity meter attached.

For fitting the activity meter 2 with the aid of the fastening strap 4, as shown in FIG. 3, the first end 6 of the fastening strap 4 is inserted into the tunnel 12. As can be properly seen in FIG. 3, the strap then projects from the tunnel on opposite sides. The recess 36 which is situated near the first end 6 in this example and thus is situated in the first part 18 of the strap, is filled up by the projection 34 of the closing member 10. In this example, the projection 34 is formed by a wall of the tunnel which, in use, comes to lie on an inner side of the loop 14 (see FIG. 5).

Figure 7:
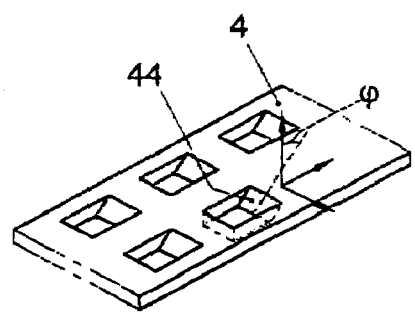
FIG. 7 shows a perspective view of a part of the strap according to FIG. 3.

Next, the strap is passed around the leg of an animal and the second end 8 is likewise inserted into the tunnel, as shown in FIG. 5. The second end 8 is thereby moved over the first end 6 on a side 40 which is situated opposite the side 42 with the recess 36. The lips project to the side 40 opposite the side 42 in which the recess 36 is provided. In this way, the lips can reach resiliently into the openings. A free end of the resilient lips each points in a direction of the second free end of the strap. A second end is inserted through the tunnel so far that it leaves the tunnel again at a position opposite the position where it is inserted into the tunnel (see FIG. 5). The free end 8 can easily be pulled further to positions where in each case a group of openings is situated above of group of lips, so that the lips of a group can reach into the openings of a group. It is also possible that the lips 28.1.1, 28.1.2, 28.2.1 and 28.2.2 reach in each case into two openings of two adjacent groups. It is not possible to pull the loop open again because this movement will be blocked by the lips, forming barbs as it were. In this way, the second end can be pulled further so far that the loop closes around the leg of the animal. In this closed position, the lips reach with play into the respective openings. The tunnel limits the deformation of the lips and a wedge effect of the resilient lip arises. What is further achieved is that the strap is adjustable in circumference. As the strap provides play in the hole, it can never be fitted too tightly. Fitting the strap can be done with particularly great ease. With one hand the activity meter can be held, with the strap already connected to the activity meter by means of the first fastening means. With the other hand, the second end 8 can be inserted through the tunnel and be pulled. Fitting the assembly can be performed both by left-handed and by right-handed persons, with the strap being correspondingly fastened left or right to the activity meter. In this example, each opening is provided with a bevel surface 44 (see FIG. 7) which includes an angle deviating from 90 degrees with the normal to the plane of the at least one opening. The at least one lip reaching into the respective opening is more or less in surface-to-surface abutment with this bevel surface.

Figure 6:
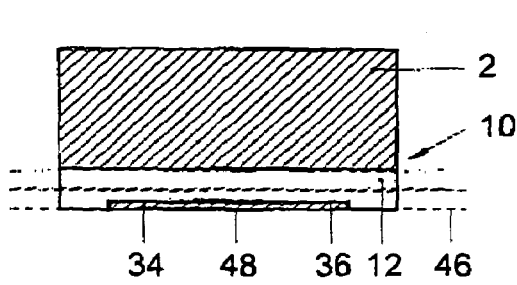
FIG. 6 shows a cross section according to FIG. 4 in which further the strap according to FIG. 3 has been fitted.

As can be properly seen in FIG. 6, an outer side 46 of the strap and an outer side 48 of the housing are in one plane at a transition between the strap and the housing. In this example, this outer side of the housing is situated against the leg of the animal. Because the transition between the strap and the housing is situated in one plane, there are no sharp transitions that can cause trouble to the animal during wearing. Furthermore, indicia may be provided on the strap, for instance the number of an animal. Such indicia can be applied before, during or after use. It is also possible that separate indicia be fastened in or to the strap, such as, for instance, sliding numbers.

Figure 1:
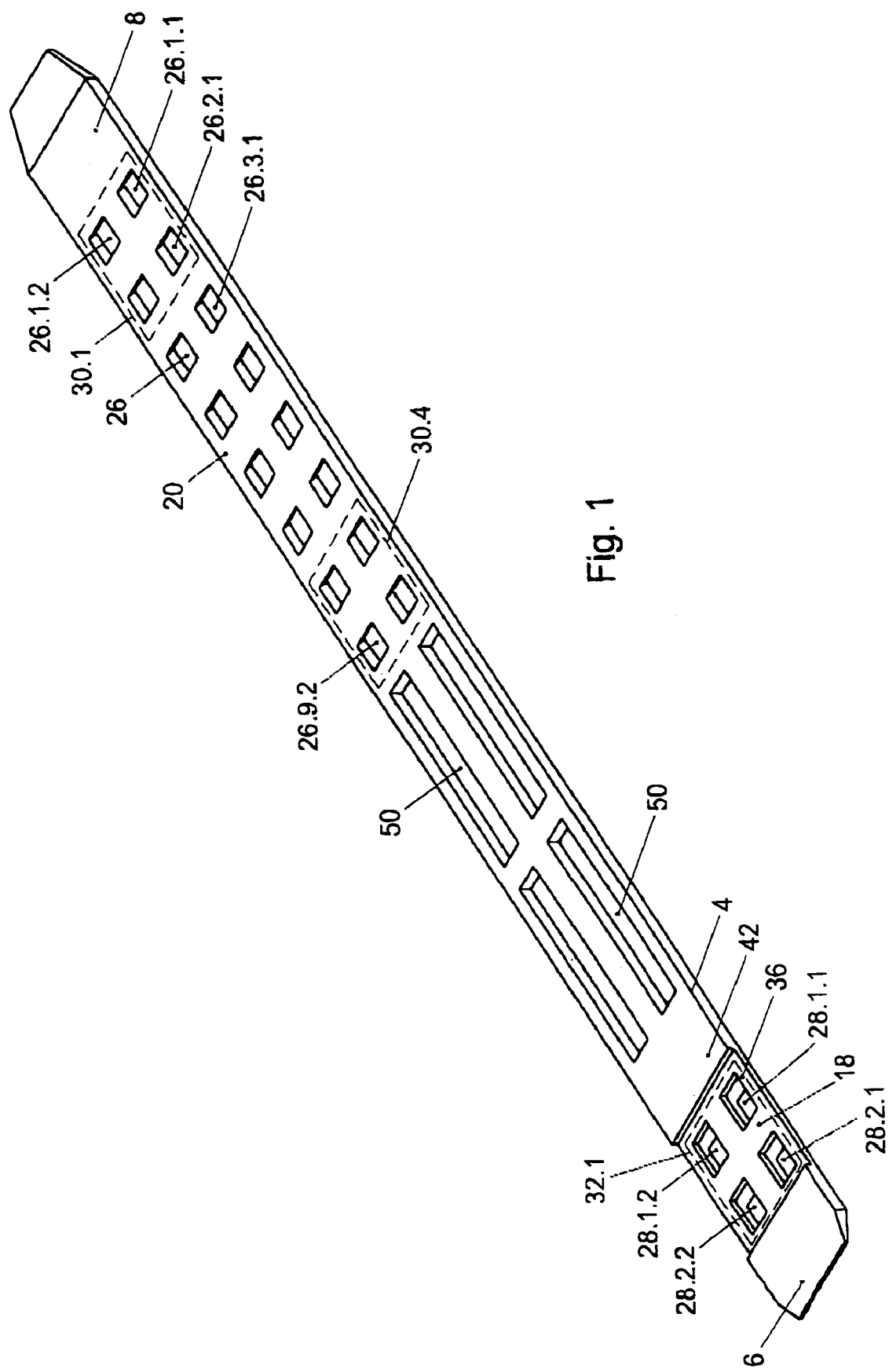
FIG. 1 shows a possible embodiment of an assembly according to the invention.
Figure 2:
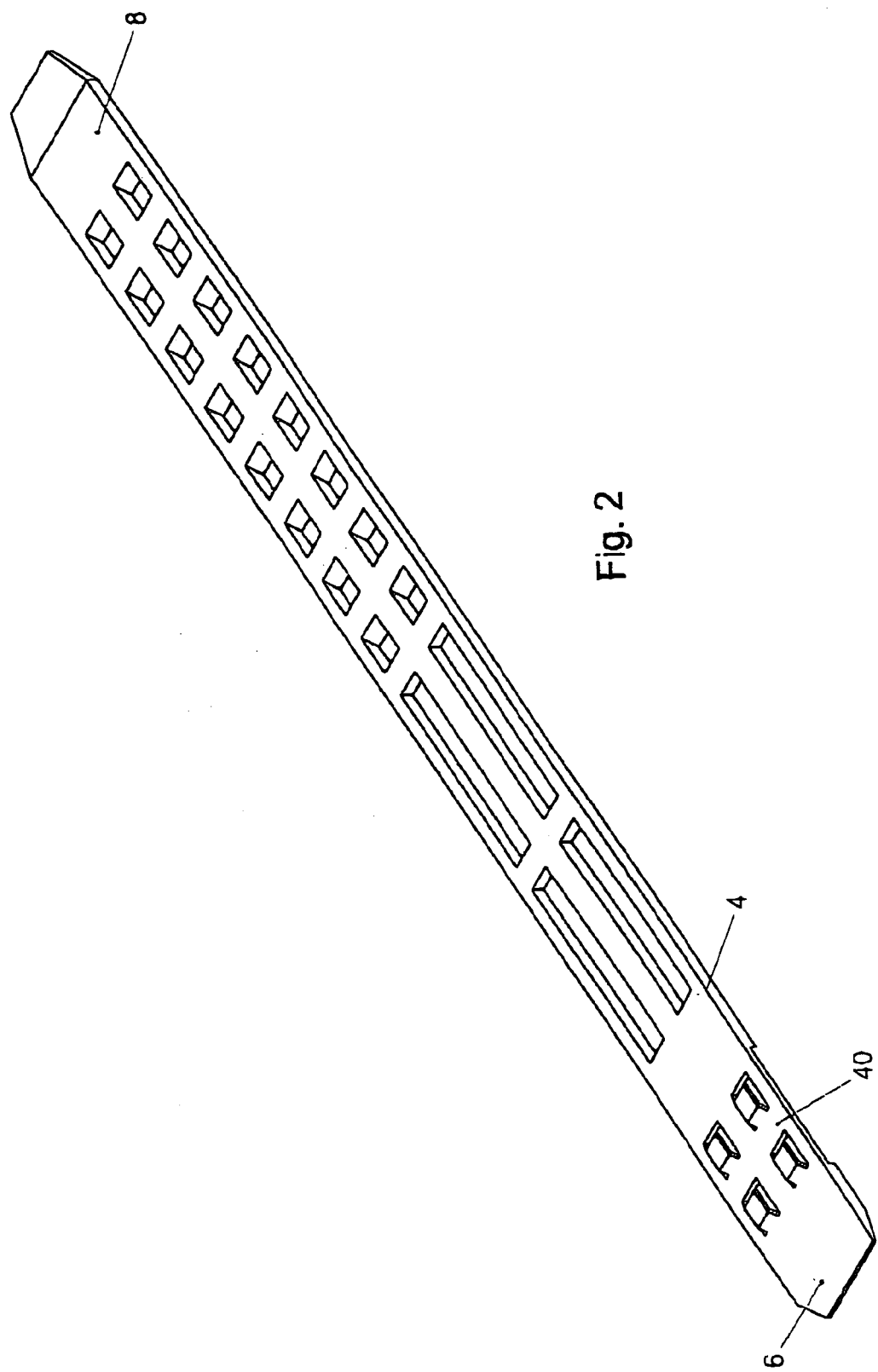
FIG. 2 shows a top plan view of the strap according to FIG. 1.

The strap may be further provided with aeration or venting holes 50 as shown in FIG. 1. The strap can consist of different combinations of materials or of a single material. In particular, the strap is manufactured from polyurethane. The strap can be formed depending on the use thereof. Also, the strap may be provided with an antibacterial additive in a plastic from which the strap is manufactured. This antibacterial additive helps avoiding infections. In particular, the strap can be made of wholly or partly transparent design. This provides the advantage, for one thing, that it can be seen if the skin of an animal is damaged under the strap or if there are any infections under the strap.

In an inner side of a tunnel, further, a recess (possibly for each lip) may be provided for receiving a part of the lip reaching through an opening in the strap. Such a recess is designated in FIG. 5 by reference numeral 52.

In the example, furthermore, the strap is provided with multiple openings which are mutually separated at regular distances in the longitudinal direction of the strap. Also, the strap is provided with multiple lips mutually separated at regular distances in the longitudinal direction of the strap. The distances in the longitudinal direction of the strap between adjacent openings are equal to the distances in the longitudinal direction of the strap between adjacent lips. However, this is not requisite. It is also possible that the groups of openings are arranged at regular mutual distances and/or that groups of lips are arranged at regular mutual distances. A distance in the longitudinal direction of the strap between two adjacent groups of openings corresponds to a distance in the longitudinal direction of the strap between two adjacent groups of lips. The distance between two adjacent openings in the longitudinal direction of the strap within a group, however, may be different from the distance between two adjacent openings of two adjacent groups. This also holds for the distance between two lips within a group and the distance between two adjacent lips of two adjacent groups.

The invention is not limited in any way to the embodiment outlined hereinabove. Thus, the first fastening means may also be formed by the tunnel clampingly enclosing the first and the second part. It is also possible that the second fastening means are provided with at least one opening in the first part of the strap and at least one resilient lip which is connected with the second part of the strap and reaches into the opening of the first part. Also, it is possible that the second fastening means are provided with at least one opening in the second part of the strap and at least one resilient lip which is connected with an inner side of the tunnel and reaches into the opening of the second part. Also, it is possible that the second fastening means are provided with at least one resilient lip which is connected with the second part of the strap and at least one opening on an inner side of the tunnel, with the lip reaching into the opening of the tunnel. In this example, the identification unit 2 is also designed as activity meter. However, this is not requisite. The identification unit 2 may also have the identification of animals as its sole function and thus be provided solely with identification means. Also, the identification unit 2 can comprise additional other means, such as a temperature sensor, a moisture sensor, a movement sensor and/or a mobile telephone and the like. All these functions and means are then preferably included in the housing of the identification unit 2. Accordingly, in this application, identification unit 2 is understood to mean a unit which is at least provided with identification means as discussed hereinbefore and optionally, in addition thereto, other means, such as a means for measuring the movement of the animal, a mobile telephone, a microcomputer, an electronic memory and/or a sensor, etc. Preferably, these additional means are included together with the identification means in the one and the same housing of the identification unit 2. Such variants are each understood to fall within the framework of the invention.

The invention claimed is:

1. An assembly of an identification unit for identifying an animal to which the identification unit, when in use, is fastened, and a fastening strap connected with the identification unit, the fastening strap being provided with a first free end and a second free end, the identification unit being provided with an identification means which responds by emitting an identification code when the identification means is introduced into an electromagnetic interrogation field, characterized in that the assembly is further provided with a closing member comprising a slotted tunnel, so that, when in use, the strap forms a loop and a first part and a second part of the strap overlie each other and are enclosed by the tunnel, the assembly being further provided with a first fastening means for connecting the first part and the closing member with each other, and a second fastening means for fastening the second part to at least one of the first part and the closing member, so that, at least a part of the second fastening means that provides the fastening of the second part to at least one of the first part and the closing member is located within the tunnel, when the second part is fastened to at least one of the first part and the closing member, wherein the tunnel is arranged in a housing of the identification unit and wherein the first fastening means comprise a recess and a projection which engage one into the other, the closing member being provided with the recess or the projection and the first part being provided with the projection or the recess, respectively, wherein an outer side of the strap and an outer side of the housing are situated in one plane at a transition between the strap and the housing.

2. The assembly according to claim 1, wherein the first fastening means are formed by the tunnel clampingly enclosing the first and second part.

3. The assembly according to claim 1, wherein the strap is made at least substantially of polyurethane.

4. The assembly according to claim 1, wherein the strap is made at least in part of transparent design.

5. An assembly of an identification unit for identifying an animal to which the identification unit, when in use, is fastened, and a fastening strap connected with the identification unit, the fastening strap being provided with a first free end and a second free end, the identification unit being provided with an identification means which responds by emitting an identification code when the identification means is introduced into an electromagnetic interrogation field, characterized in that the assembly is further provided with a closing member comprising a slotted tunnel, so that, when in use, the strap forms a loop and a first part and a second part of the strap overlie each other and are enclosed by the tunnel, the assembly being further provided with a first fastening means for connecting the first part and the closing member with each other, and a second fastening means for fastening the second part to at least one of the first part and the closing member, so that, at least a part of the second fastening means that provides the fastening of the second part to at least one of the first part and the closing member is located within the tunnel when the second part is fastened to at least one of the first part and the closing member, wherein the tunnel is arranged in a housing of the identification unit and wherein the first fastening means comprise a recess and a projection which engage one into the other, the closing member being provided with the recess or the projection and the first part being provided with the projection or the recess, respectively, wherein:

the second fastening means are provided with at least one opening in the second part of the strap and at least one resilient lip which is connected with the first part of the strap and which, in use, reaches into the opening of the second part, or the second fastening means are provided with at least one opening in the first part of the strap and at least one resilient lip which is connected with the second part of the strap and which, in use, reaches into the opening of the first part, or the second fastening means are provided with at least one opening in the second part of the strap and at least one resilient lip which is connected with an inner side of the tunnel and which, in use, reaches into the opening of the second part of the strap, or the second fastening means are provided with at least one resilient lip which is connected with the second part of the strap and at least one opening on an inner side of the tunnel, with the lip, in use, reaching into the opening of the tunnel, and wherein an outer side of the strap and an outer side of the housing are situated in one plane at a transition between the strap and the housing.

6. The assembly according to claim 5, wherein the second fastening means are provided with at least one opening in the second part of the strap and at least one resilient lip which is connected with the first part of the strap and which, in use, reaches into the opening of the second part wherein in use a free end of the resilient lip points in a direction of the second free end of the strap.

7. The assembly according to claim 5, wherein the strap is provided with multiple openings mutually separated at a regular distance in the longitudinal direction of the strap.

8. The assembly according to claim 7, wherein the regular distance between the openings is equal to the regular distance between the lips.

9. The assembly according to claim 5, wherein the strap is provided with multiple lips mutually separated at a regular distance in the longitudinal direction of the strap.

10. The assembly according to claim 5, wherein the number of openings is greater than the number of lips.

11. The assembly according to claim 5, wherein the openings extend over a greater part of the strap than the lips.

12. The assembly according to claim 5, wherein the openings are arranged in groups, with each group comprising at least two openings.

13. The assembly according to claim 12, wherein the number of groups of openings is greater than the number of groups of lips.

14. The assembly according to claim 13, wherein the groups of openings extend over a greater part of the strap than the groups of lips.

15. The assembly according to claim 12, wherein a pattern of a mutual arrangement of openings within the group of openings is equal to a pattern of a mutual arrangement of the lips within the group of lips.

16. The assembly according to claim 12, wherein each group of lips comprises at least two lips which are separated at a distance from each other in a direction traverse to the longitudinal direction of the strap.

17. The assembly according to claim 5, wherein the lips are arranged in groups, with each group comprising at least two lips.

18. The assembly according to claim 17, wherein each group of lips comprises at least two lips which are separated at a distance from each other in a direction traverse to the longitudinal direction of the strap.

19. The assembly according to claim 5, wherein the first fastening means are formed by the tunnel clampingly enclosing the first and second part.

20. The assembly according to claim 5, wherein the strap is made at least substantially of polyurethane.

21. The assembly according to claim 5, wherein the strap is provided with an antibacterial additive.

22. The assembly according to claim 5, wherein the lip reaches into the at least one opening with play.

23. The assembly according to claim 5, wherein the strap is made at least in part of transparent design.

24. An assembly of an identification unit for identifying an animal to which the identification unit, when in use, is fastened, and a fastening strap connected with the identification unit, the fastening strap being provided with a first free end and a second free end, the identification unit being provided with an identification means which responds by emitting an identification code when the identification means is introduced into an electromagnetic interrogation field, characterized in that the assembly is further provided with a closing member comprising a slotted tunnel, so that, when in use, the strap forms a loop and a first part and a second part of the strap overlie each other and are enclosed by the tunnel, the assembly being further provided with a first fastening means for connecting the first part and the closing member with each other, and a second fastening means for fastening the second part to at least one of the first part and the closing member, so that, at least a part of the second fastening means that provides the fastening of the second part to at least one of the first part and the closing member is located within the tunnel, when the second part is fastened to at least one of the first part and the closing member, wherein the tunnel is arranged in a housing of the identification unit and wherein the first fastening means comprise a recess and a projection which engage one into the other, the closing member being provided with the recess or the projection and the first part being provided with the projection or the recess, respectively, and wherein the second fastening means are provided with at least one opening on the one hand and at least one resilient lip on the other hand, which, in use, reaches into the at least one opening for fastening.

25. An assembly of an identification unit for identifying an animal to which the identification unit, when in use, is fastened, and a fastening strap connected with the identification unit, the fastening strap being provided with a first free end and a second free end, the identification unit being provided with an identification means which responds by emitting an identification code when the identification means is introduced into an electromagnetic interrogation field, characterized in that the assembly is further provided with a closing member comprising a slotted tunnel, so that, when in use, the strap forms a loop and a first part and a second part of the strap overlie each other and are enclosed by the tunnel, the assembly being further provided with a first fastening means for connecting the first part and the closing member with each other, and a second fastening means for fastening the second part to at least one of the first part and the closing member, so that, at least a part of the second fastening means that provides the fastening of the second part to at least one of the first part and the closing member is located within the tunnel when the second part is fastened to at least one of the first part and the closing member, wherein the tunnel is arranged in a housing of the identification unit and wherein the first fastening means comprise a recess and a projection which engage one into the other, the closing member being provided with the recess or the projection and the first part being provided with the projection or the recess, respectively, wherein:

the second fastening means are provided with at least one opening in the second part of the strap and at least one resilient lip which is connected with the first part of the strap and which, in use, reaches into the opening of the second part, or the second fastening means are provided with at least one opening in the first part of the strap and at least one resilient lip which is connected with the second part of the strap and which, in use, reaches into the opening of the first part, or the second fastening means are provided with at least one opening in the second part of the strap and at least one resilient lip which is connected with an inner side of the tunnel and which, in use, reaches into the opening of the second part of the strap, or the second fastening means are provided with at least one resilient lip which is connected with the second part of the strap and at least one opening on an inner side of the tunnel, with the lip, in use, reaching into the opening of the tunnel, and wherein a recess is provided in an inner side of the tunnel for receiving a part of the lip reaching through the opening.

26. An assembly of an identification unit for identifying an animal to which the identification unit, when in use, is fastened, and a fastening strap connected with the identification unit, the fastening strap being provided with a first free end and a second free end, the identification unit being provided with an identification means which responds by emitting an identification code when the identification means is introduced into an electromagnetic interrogation field, characterized in that the assembly is further provided with a closing member comprising a slotted tunnel, so that, when in use, the strap forms a loop and a first part and a second part of the strap overlie each other and are enclosed by the tunnel, the assembly being further provided with a first fastening means for connecting the first part and the closing member with each other, and a second fastening means for fastening the second part to at least one of the first part and the closing member, so that, at least a part of the second fastening means that provides the fastening of the second part to at least one of the first part and the closing member is located within the tunnel when the second part is fastened to at least one of the first part and the closing member, wherein the tunnel is arranged in a housing of the identification unit and wherein the first fastening means comprise a recess and a projection which engage one into the other, the closing member being provided with the recess or the projection and the first part being provided with the projection or the recess, respectively, wherein:

the second fastening means are provided with at least one opening in the second part of the strap and at least one resilient lip which is connected with the first part of the strap and which, in use, reaches into the opening of the second part, or the second fastening means are provided with at least one opening in the first part of the strap and at least one resilient lip which is connected with the second part of the strap and which, in use, reaches into the opening of the first part, or the second fastening means are provided with at least one opening in the second part of the strap and at least one resilient lip which is connected with an inner side of the tunnel and which, in use, reaches into the opening of the second part of the strap, or the second fastening means are provided with at least one resilient lip which is connected with the second part of the strap and at least one opening on an inner side of the tunnel, with the lip, in use, reaching into the opening of the tunnel, and wherein the at least one opening is provided with a bevel surface which includes an angle deviating from 90 degrees with the normal to the plane of the at least one opening and against which the at least one lip abuts more or less in surface-to-surface contact.

* * * * *